No. 859,456. PATENTED JULY 9, 1907.
R. LOVE.
FERTILIZER DISTRIBUTER.
APPLICATION FILED OCT. 15, 1904.
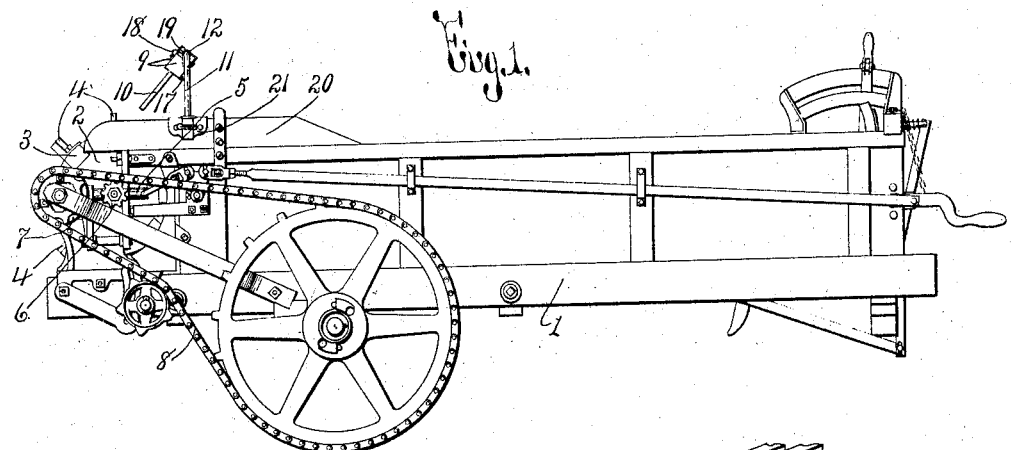
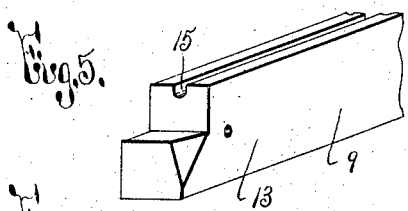
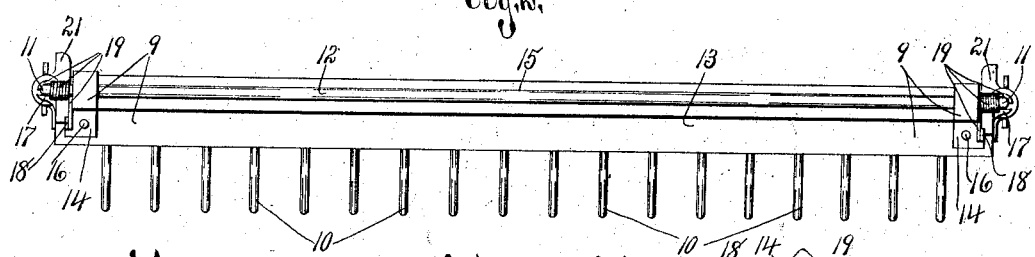
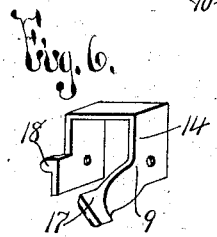
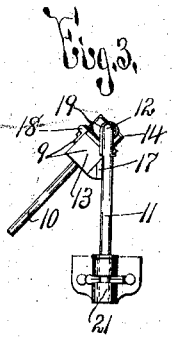
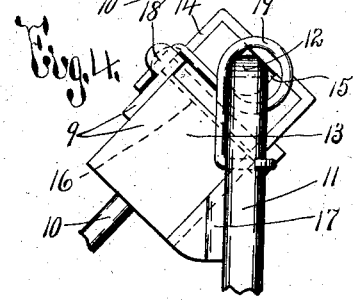
WITNESSES:
Chas. J. Toner.
Chas. H. Young.
INVENTOR
Robert Love
BY
Acy & Parsons
ATTORNEYS

UNITED STATES PATENT OFFICE.

ROBERT LOVE, OF SYRACUSE, NEW YORK, ASSIGNOR TO KEMP & BURPEE MANUFACTURING COMPANY, OF SYRACUSE, NEW YORK, A CORPORATION OF NEW YORK.

FERTILIZER-DISTRIBUTER.

No. 859,456.      Specification of Letters Patent.      Patented July 9, 1907.

Original application filed March 17, 1904, Serial No. 198,552. Divided and this application filed October 15, 1904.
Serial No. 222,499.

*To all whom it may concern:*

Be it known that I, ROBERT LOVE, of Syracuse, in the county of Onondaga, in the State of New York, have invented a certain new and useful Fertilizer-Distributer, of which the following is a specification.

My invention relates to fertilizer-distributers, and has for its object the production of a particularly simple and highly efficient means for facilitating the breaking up of the fertilizer during the discharge thereof.

In describing this invention, reference is had to the accompanying drawing, in which like characters designate corresponding parts in all the views.

Figure 1 is a side elevation of my distributer, the supporting wheels being removed. Figs. 2 and 3 are, respectively, top plan and end view of the comb. Fig. 4 is an enlarged end view of parts seen in Fig. 3. Figs. 5 and 6 are isometric views of parts of the comb.

This fertilizer-distributer comprises, generally, a receptacle or body 1 for the fertilizer, a discharging device 2, and a comb. The receptacle 1 is of any desirable form, size and construction, is mounted on suitable supporting wheels, not illustrated, and is provided with an open rear end, and with the usual bottom or conveyer, not shown, movable rearwardly for feeding the fertilizer to the discharging device. This device 2 is also of any suitable form, size and construction, being here illustrated as a rotatable beater, extending crosswise of the receptacle 1 at the rear end thereof, and comprising a frame cylindrical in form and usually composed of separated lengthwise bars 3 having teeth 4 projecting therefrom. Said device 2 is illustrated as supported by reciprocating bearings 5 and as provided with a toothed wheel 6 which coacts with a wheel 7, driven by a chain 8, but as the means for supporting and rotating the device 2 forms no part of my present invention, further description thereof herein is deemed unnecessary, especially as said means is fully set forth and described in my pending application, Serial No. 198,552, filed March 17, 1904, of which earlier application, this present case is a division.

The comb comprises a rocking bar or retarder 9 disposed crosswise of the rear portion of the receptacle 1 and provided with depending teeth 10 arranged in the path of the fertilizer, when being discharged. The bar 9 is supported by uprights 11 provided on opposite sides of the receptacle, and by a cross-rod or bar 12, connecting the upper ends of the uprights which are preferably integral with the rod 12, forming downturned extensions thereof, said rocking bar 9 being usually journaled on the cross-bar 12 and free to turn thereon.

As preferably constructed, the rocking bar 9 comprises main and end sections 13, 14, the main section 13 being composed of wood and having a lengthwise groove 15 in its top face which receives and substantially fits the cross-bar 12, and the end sections 14 being formed substantially U-shaped and having their intermediate portions lapped upon the ends of the top face of the section 13 and passed over the ends of the cross-bar 12, and having their ends extended downwardly on opposite sides of the section 13 and secured thereto by bolts 16, the front ends of the sections 14 being provided with shoulders 17 engaged with the rear faces of the uprights 11, and the rear ends of said sections 14 being provided with additional shoulders 18.

Springs 19 are arranged between the ends of the rocking bar 9 and the uprights 11, being here illustrated as coiled upon the ends of the cross-bar 12 and having corresponding ends engaged with the shoulders 18 and their other ends engaged with the front faces of the uprights 11. These springs 19 normally hold the shoulders 17 on the ends of the rocking bar 9 in engagement with the rear faces of the uprights 11, and permit the bar 9 to yield in the direction of movement of the fertilizer being discharged. Said uprights 11 are mounted upon lengthwise bars 20 at opposite sides of the rear of the receptacle and are united to said bars by brackets 21.

The construction and operation of my fertilizer-distributer will now be readily understood upon reference to the foregoing description and the accompanying drawing, and it will be apparent to those skilled in the art that more or less change may be made in the component parts thereof, without departing from the spirit of my invention.

Having thus fully described my invention, what I claim as new and desire to secure by Letters Patent, is:—

1. In a manure spreader, the combination with the body, of a rearwardly movable conveyer located at its bottom, a rod transversely located on the rear portion of the body and having its ends downturned and secured to the sides of the body, a piece loosely mounted on the transverse rod near each of its ends and having a downwardly extending projection, a retarder connected to said downward projection and extending downward so as to retard the distribution of the load, a spring coiled around the transverse rod near each of its ends, one end of each of said springs engaging the projection on the piece and the other end of the spring engaging the downturned end of the transverse rod, substantially as described.

2. In a fertilizer-distributer, the combination of a receptacle for the fertilizer, a discharging device, a rearwardly movable conveyer, a rod transversely located at the rear portion of the receptacle and having its ends down-turned and secured to the sides of the receptacle, a rocking bar journaled on the rod and provided with depending teeth, and yielding means connecting the down-turned ends of the rod and the rocking bar, substantially as and for the purpose described.

3. In a fertilizer-distributer, the combination with a receptacle for the fertilizer, a discharging device, and a rearwardly moving conveyer, of uprights, a comb journaled on the uprights and free to turn thereon and provided with shoulders for engaging the rear faces thereof, and yielding means for engaging said shoulders with the uprights, substantially as and for the purpose specified.

4. In a fertilizer-distributer, the combination of a receptacle for the fertilizer, a discharging device, a rearwardly movable conveyer, a rod transversely located at the rear portion of the receptacle and having its ends down-turned and secured to the sides of the receptacle, a rocking bar journaled on the rod and provided with depending teeth, said bar being also provided at its ends with shoulders for engaging the uprights, and yielding means for holding said shoulders in engagement with the uprights, substantially as and for the purpose specified.

5. In a fertilizer-distributer, the combination of a receptacle for the fertilizer, a discharging device, a rearwardly movable conveyer, a rod transversely located at the rear portion of the receptacle, a rocking bar comprising a main section having a groove in its top face for receiving the rod, and end sections passed over the ends of the rod and fixed to the main section, means coöperating with the end sections for limiting the movement of the rocking bar, and yielding means for holding the end sections in engagement with the first-mentioned means, substantially as and for the purpose set forth.

6. In a fertilizer-distributer, the combination of a receptacle for the fertilizer, a discharging device, a rearwardly movable conveyer, a rod transversely located at the rear portion of the receptacle, uprights at the sides of the receptacle for supporting the ends of the rod, a rocking bar comprising a main section, and end sections journaled on the rod, said end sections being extended downwardly from the rod and provided with shoulders engaging rear faces of the uprights, and yielding means for holding the shoulders of the rocking bar in engagement with the uprights, substantially as and for the purpose described.

7. In a fertilizer-distributer, the combination of a receptacle for the fertilizer, a discharging device, a rearwardly movable conveyer, a rod transversely located at the rear portion of the receptacle, uprights at the sides of the receptacle for supporting the ends of the rod, a rocking bar provided with end sections having front and rear parts depending from the rod and spaced a distance apart and each provided with shoulders, the shoulders on the front parts being engaged with rear faces of the uprights, and springs coiled around the ends of the rod and having corresponding ends engaged with the other shoulders of the end sections and their opposite ends engaged with front faces of the uprights, substantially as and for the purpose specified.

8. In a fertilizer-distributer, the combination of a receptacle for the fertilizer, a discharging device, a rearwardly movable conveyer, a rod transversely located at the rear portion of the receptacle, uprights at the sides of the receptacle for supporting the ends of the rod, a rocking bar comprising a main section and end sections passed over the ends of the rod and fixed to the main section, said end sections having front and rear parts depending from the rod and spaced a distance apart and each provided with shoulders, the shoulders on the front parts being engaged with rear faces of the uprights, and springs coiled around the ends of the rod and having corresponding ends engaged with the other shoulders of the end sections and their opposite ends engaged with front faces of the uprights, substantially as and for the purpose set forth.

In testimony whereof, I have hereunto signed my name in the presence of two attesting witnesses, at Syracuse, in the county of Onondaga, in the State of New York, this 5th day of October, 1904.

ROBERT LOVE.

Witnesses:
S. DAVIS,
D. LAVINE.